June 24, 1958 F. H. TOWLER ET AL 2,840,106
HYDRAULIC VARIABLE PRESSURE RELIEF VALVES
Filed Aug. 13, 1953 2 Sheets-Sheet 1
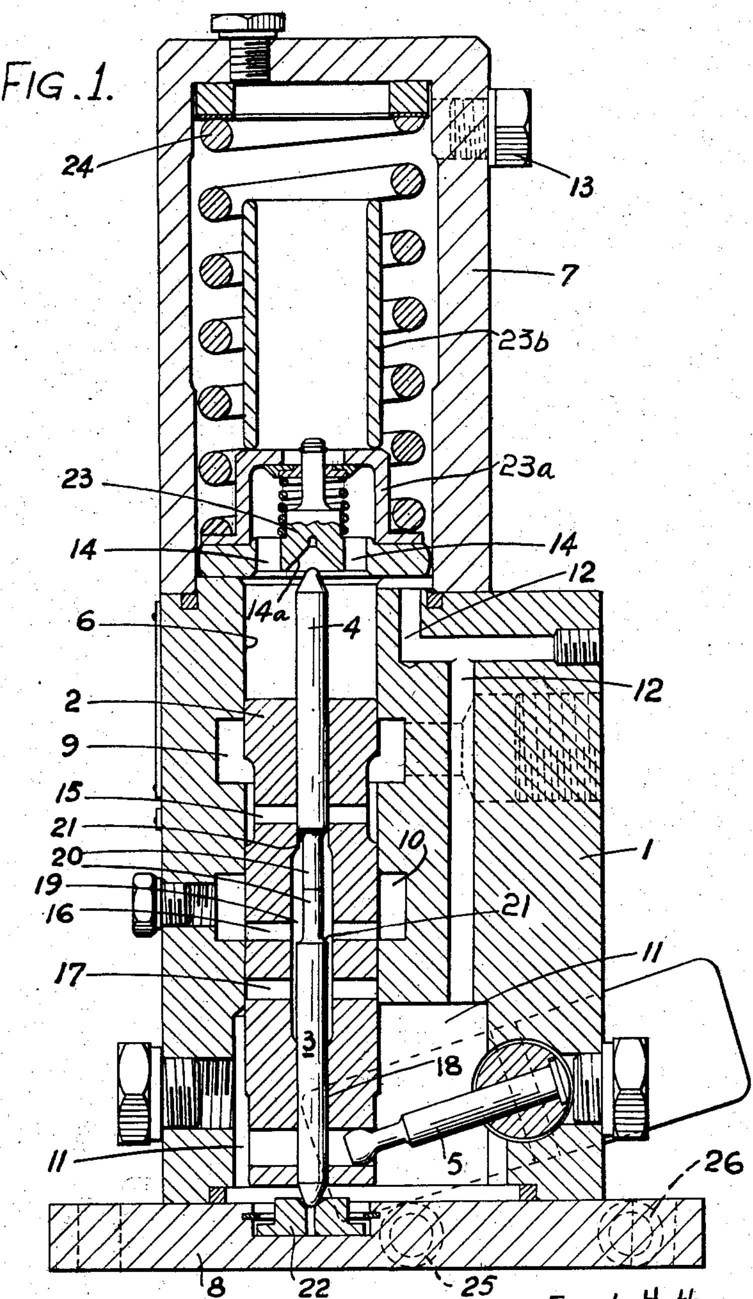
INVENTORS
Frank Hathorn Towler
John Maurice Towler
BY
Cushman, Darby & Cushman
ATTORNEYS HYDRAULIC VARIABLE PRESSURE RELIEF VALVES
Filed Aug. 13, 1953 2 Sheets-Sheet 2
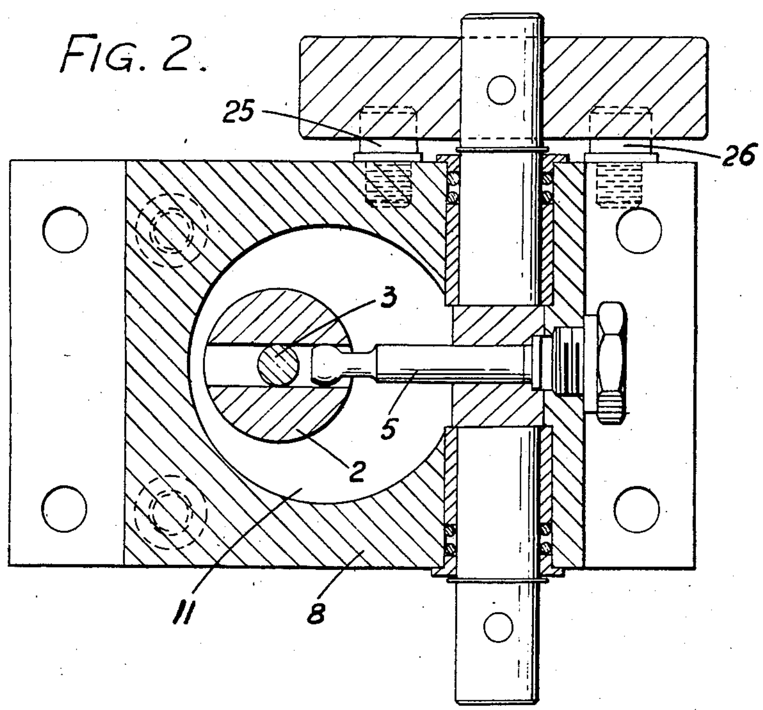
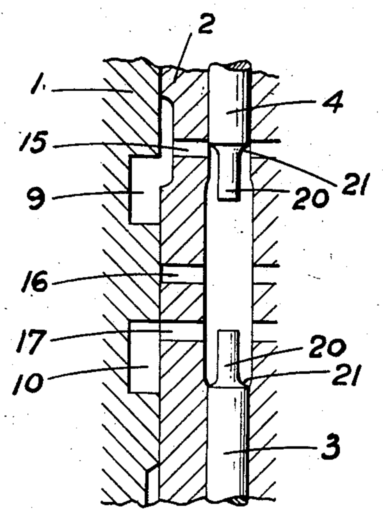
FIG. 3.
INVENTORS
Frank Hathorn Towler
John Maurice Towler
BY
Cushman, Darby, Hubbard & Wolfe
ATTORNEYS United States Patent Office 2,840,106

Patented June 24, 1958

2,840,106

HYDRAULIC VARIABLE PRESSURE RELIEF VALVES

Frank Hathorn Towler, Rodley, and John Maurice Towler, Dob Park, near Otley, England, assignors to Electraulic Presses Limited, Rodley, England, a limited-liability company

Application August 13, 1953, Serial No. 373,972

Claims priority, application Great Britain August 22, 1952

4 Claims. (Cl. 137—538)

This invention relates to hydraulic relief valves of the type comprising a valve member which is movable relatively to inlet and outlet ports and is acted upon at one end by the pressure liquid to move the same against a spring load to connect said ports and provide a passage to exhaust for the pressure liquid when it reaches a predetermined pressure. Such pressure is usually termed the blow off pressure of the valve.

In relief valves of the above type as now commonly constructed the blow off pressure is carried by adjusting the compression of the spring by means of a hand wheel acting through a screw and an engaging nut.

The object of the present invention is to provide a relief valve having improved means for adjusting the blow off pressure which will permit the adjustment to be effected at will, even when the valve is under load, by a simple hand or foot operated lever.

Broadly the present invention consists of a hydraulic relief valve of the above type in which the inlet and outlet ports that are opened and closed by the valve member are formed in a member which is movable relatively to and independently of the spring loaded valve member whereby the position of said ports relative to the valve member may be changed to vary the pressure at which the valve will blow off.

A hydraulic relief valve according to a preferred embodiment of the invention comprises, in combination, a valve casing having a bore and an inlet and outlet for pressure liquid, said inlet and outlet being separated from each other and communicating with said bore, an annular sleeve fitting slidably in said bore and arranged to be in hydraulic balance so as to be movable longitudinally therein, preferably by a direct acting hand or foot operated lever on the outside of the valve casing, ports in the wall of said sleeve which provide further inlet and outlet passages for the pressure liquid and a valve spindle which is a close sliding fit in the central bore of the annular sleeve said valve spindle being movable against a spring load relative to the sleeve by pressure of the pressure liquid acting on an area at one end of the spindle, said movement producing a gradual increase in the spring load and being from a position where the valve spindle isolates the ports in the sleeve from each other to another position where a connection between said ports is established and the pressure liquid is free to exhaust, the arrangement being such that by relative movement of the sleeve the extent to which the spring is compressed when the valve spindle has moved to the exhaust position is varied at will and therefore the pressure which the pressure liquid has to reach before its release to exhaust by the valve can take place.

In order that the invention may be clearly understood and carried into effect an example according to the above embodiment will now be described by aid of the accompanying drawings in which:

Fig. 1 is a vertical section through the improved relief valve.

Fig. 2 is a transverse section on the line B—B of Fig. 1 and

Fig. 3 is a detail hereafter to be described.

The hydraulic variable pressure relief valve shown in the drawings comprises a body 1, a sliding ported sleeve 2, valve spindles 3 and 4 and a lever 5 which may be operated either by hand or by foot.

The valve body 1 has a through bore 6 which is closed at its upper end by a spring casing 7 and at its lower end by a base plate 8; the ported sleeve 2 is a sliding lap-fit in the through bore 6.

The through bore 6 is enlarged to provide an annular chamber 9 which is connected to exhaust and a further annular chamber 10 which is connected by an inlet to the pressure liquid. At the lower end of the through bore 6 there is provided a still further annular chamber 11 into which projects the inner end of the lever 5 for the purpose of engaging the lower end of the ported sleeve 2. The chamber 11 communicates by means of passages 12 with the interior of the spring casing 7, which spring casing in turn is connected to exhaust by a drain connection 13. As the upper end of the through bore is permanently open to the interior of the spring casing 7 by ports 14 in a spring pad 23, both ends of the ported sleeve will thus be connected to exhaust, and, in consequence, will always by in hydraulic balance. The sleeve is thus always movable with a minimum of effort such as may be imparted by hand or foot through the lever 5.

The sleeve 2 is provided with three sets of radial ports 15, 16 and 17 respectively, each set being at a different height in the length of the sleeve whereby the radial ports 15 communicate at all positions of the sleeve with the annular exhaust chamber 9, the radial ports 16 with the pressure chamber 10 when the sleeve is in the lower position, and the radial ports 17 also communicate with the pressure chamber 10 when the sleeve is in its upper position.

The sleeve 2 has a through bore 18 in which the valve spindles 3 and 4 are a lap-fit and such bore has a portion of increased diameter to provide an annular space 19 surrounding the opposing and meeting ends of the valve spindles and adapted to be supplied with pressure liquid by the radial ports 16 and 17 in turn. To provide the necessary areas on the valve spindles against which the pressure within the space 19 can act, said valve spindles at their opposing ends are formed with reduced portions 20. The aforesaid areas are indicated at 21. The action of the pressure within the space 21 when acting against the areas 21 on the valve spindles is to hold the lower valve spindle 3 on its seating 22 and to press the upper valve spindle 4 against the spring pad 23 as shown in Fig. 1, the spring pad 23 comprises a disc-shaped body pierced by a series of ports 14 and slidably received in the spring casing 7. The underside of the pad is formed centrally with a conical socket 14*a* for reception of the upper end of the spindle 4. A spring cup 23*a* is formed with a flange adapted to rest on the pad and provide a seat for a spring 24 interposed between the flange and the end of the casing 7. The spring 24 yieldably urges the pad 23 into engagement with the end of the housing 1 which thus serves to define one limit position of the pad. A stop sleeve 23*b* carried on the top of the spring cup coacts with the upper end of the casing 7 to define the other limit position of the pad. When the pressure within the space 19 reaches a predetermined value this upward pressure on the valve spindle 4 will cause the same to move upwards against the opposing pressure of a spring 24 within the spring casing 7 until it reaches a position where the upper set of radial ports 15 have their inner ends opened to the space 19 by way of the reduced inner end of the valve spindle 4, see Fig. 3, and thus allow pressure liquid within the annular chamber 10 to flow into the annular chamber 9 and so to exhaust.

It will thus be seen that the pressure at which the liquid within the chamber 10 is permitted to exhaust is dependent upon the extent of upward movement the valve spindle 4 has to make before its reduced end breaks into the upper radial ports 15. Therefore by moving the sleeve 2 to a predetermined extent in an upward direction, the upward movement required to be made by the valve spindle 4 before exhaust or blow off will take place will be correspondingly increased and also the pressure which the liquid within the chamber 10 will have to attain before such release can take place.

The valve illustrated is designed to enable the sleeve 2 to be moved by the lever 5 into and out of two extreme positions and these are determined by limiting stops 25 and 26; the stop 25 being contacted by the inner end of the lever 5 to limit the downward movement of the sleeve 2 and the stop 26 being contacted by the lever to limit the upward movement of the sleeve.

What we claim is:

1. A hydraulic relief valve comprising in combination a valve casing having a bore and an inlet and outlet for pressure liquid, said inlet and outlet being separated from each other and communicating with said bore, an annular sleeve fitting slidably in said bore and arranged to be in hydraulic balance so as to be movable longitudinally therein, preferably by a direct acting hand or foot operated lever on the outside of the valve casing, ports in the wall of said sleeve which provide further inlet and outlet passages for the pressure liquid and a valve spindle which is a close sliding fit in the central bore of the annular sleeve said valve spindle being movable against a spring load relative to the sleeve by pressure of the pressure liquid acting on an area at one end of the spindle, said movement producing a gradual increase in the spring load and being from a position where the valve spindle isolates the ports in the sleeve from each other to another position where a connection between said ports is established and the pressure liquid is free to exhaust, the arrangement being such that by relative movement of the sleeve the extent to which the spring is compressed when the valve spindle has moved to the exhaust position is varied at will and therefore the pressure which the pressure liquid has to reach before its release to exhaust by the valve can take place.

2. A hydraulic relief valve according to claim 1 having two stops which limit the movement of the sleeve to two extreme positions corresponding respectively to a minimum blow off pressure and a maximum blow off pressure, said sleeve being provided with three sets of radial ports in its length and said bore being formed interiorly with two annular recesses, one recess being permanently open to the pressure liquid inlet in the casing and one set of radial ports in the sleeve with an adjacent set of radial ports closed by the wall of the bore in the casing and the other annular recess being permanently open to the exhaust outlet in the casing and the third set of radial ports in the sleeve, the arrangement being such that with the sleeve in the position of minimum pressure exhausting takes place through the ports which are normally open to both annular recesses and in the position of maximum pressure exhausting takes place through the set of radial ports normally closed to the inlet by the wall of the bore in the casing and the radial ports which are permanently open to the exhaust outlet.

3. A hydraulic relief valve comprising, in combination, a valve body having a bore with inlet and outlet passages opening thereto, a sleeve member slidably fitted in said bore having radially disposed ports open to the respective passages, a valve spindle reciprocable in said sleeve member between open and closed positions to establish or interrupt communication between said passages by way of said ports, said spindle having one end exposed to the pressure at the inlet passage and tending to shift it toward open position, spring means interposed between the valve body and the other end of said spindle to resist movement to open position, and means for shifting said sleeve member along said bore and relative to said spindle to determine the pressure at the inlet passage required to overcome the force of said spring means and effect movement of the valve spindle to open position.

4. A hydraulic relief valve comprising, in combination, a valve body having a bore with inlet and outlet passages opening thereto, a sleeve member fitted in said bore and slidable therein between two limit positions, said sleeve member having ports open to the respective passages in the valve body, a valve spindle reciprocable in said sleeve member between open and closed positions to establish or interrupt communication between said passages by way of said ports, a spring biased pad positioned for engagement by one end of said spindle upon movement toward open position, said pad being spaced from said spindle so as to permit unopposed movement of the spindle to open position when said sleeve member is in one limit position, and said spring biased pad applying progressively increasing resistance to the movement of the spindle to open position as said sleeve member is shifted toward its other limit position.

References Cited in the file of this patent

UNITED STATES PATENTS

| | | |
|---|---|---|
| 2,206,356 | Hutchings | July 2, 1940 |
| 2,303,711 | Stadlin | Dec. 1, 1942 |
| 2,464,283 | Adams | Mar. 15, 1949 |
| 2,637,339 | Pease | May 5, 1953 |

FOREIGN PATENTS

| | | |
|---|---|---|
| 672,340 | Great Britain | of 1952 |